US011105708B2

(12) United States Patent
Wu et al.

(10) Patent No.: US 11,105,708 B2
(45) Date of Patent: Aug. 31, 2021

(54) BIDIRECTIONAL VARIABLE CROSS-SECTION WATER-PRESSURE BEARER CYCLE TEST SYSTEM FOR COAL MINE WATER INRUSH MODEL TEST

(71) Applicant: CHINA UNIVERSITY OF MINING & TECHNOLOGY, BEIJING, Beijing (CN)

(72) Inventors: Qiang Wu, Beijing (CN); Lei Niu, Beijing (CN); Shucai Li, Beijing (CN); Shouqiang Liu, Beijing (CN); Yifan Zeng, Beijing (CN); Shengheng Xu, Beijing (CN)

(73) Assignee: CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 451 days.

(21) Appl. No.: 15/105,369

(22) PCT Filed: Oct. 21, 2014

(86) PCT No.: PCT/CN2014/089015
§ 371 (c)(1),
(2) Date: Jun. 16, 2016

(87) PCT Pub. No.: WO2015/090108
PCT Pub. Date: Jun. 25, 2015

(65) Prior Publication Data
US 2016/0327449 A1   Nov. 10, 2016

(30) Foreign Application Priority Data
Dec. 18, 2013   (CN) .......................... 201310696435.X

(51) Int. Cl.
*G01M 10/00* (2006.01)

(52) U.S. Cl.
CPC .................................. *G01M 10/00* (2013.01)

(58) Field of Classification Search
None
See application file for complete search history.

(56) References Cited

U.S. PATENT DOCUMENTS 9,701,919 B2 * 7/2017 Atarashiya ................ C10L 9/06

FOREIGN PATENT DOCUMENTS

CN         205948590 U  *  2/2017

* cited by examiner

*Primary Examiner* — Andre J Allen
*Assistant Examiner* — Jermaine L Jenkins
(74) *Attorney, Agent, or Firm* — Westbridge IP LLC

(57) ABSTRACT

A bidirectional variable cross-section water-pressure bearer cycle test system for a coal mine water inrush model test, comprising a water-pressure loading portion and a water-pressure bearer portion, wherein the water-pressure loading portion has a water supply tank, a loading water pump, a water piezometer, a water control valve, a water inlet pipe, a water discharge pipe, etc., through the loaded water pressure to control the cyclic loading of the water pressure. The water-pressure bearer portion has a variable cross-section water-pressure bearer assembly and a airtight main frame variable water-level water-pressure bearer assembly. The variable cross-section water-pressure bearer assembly has a cross-section water storage tank, a cross-section water baffle and a cross-section porous plate, and the water-pressure bearer assembly has a water-level water storage tank, a water-level water baffle and a water-level porous plate, which through loading or unloading the size of water control the bidirectional variable cross-section water-pressure bearer cycle.

8 Claims, 1 Drawing Sheet

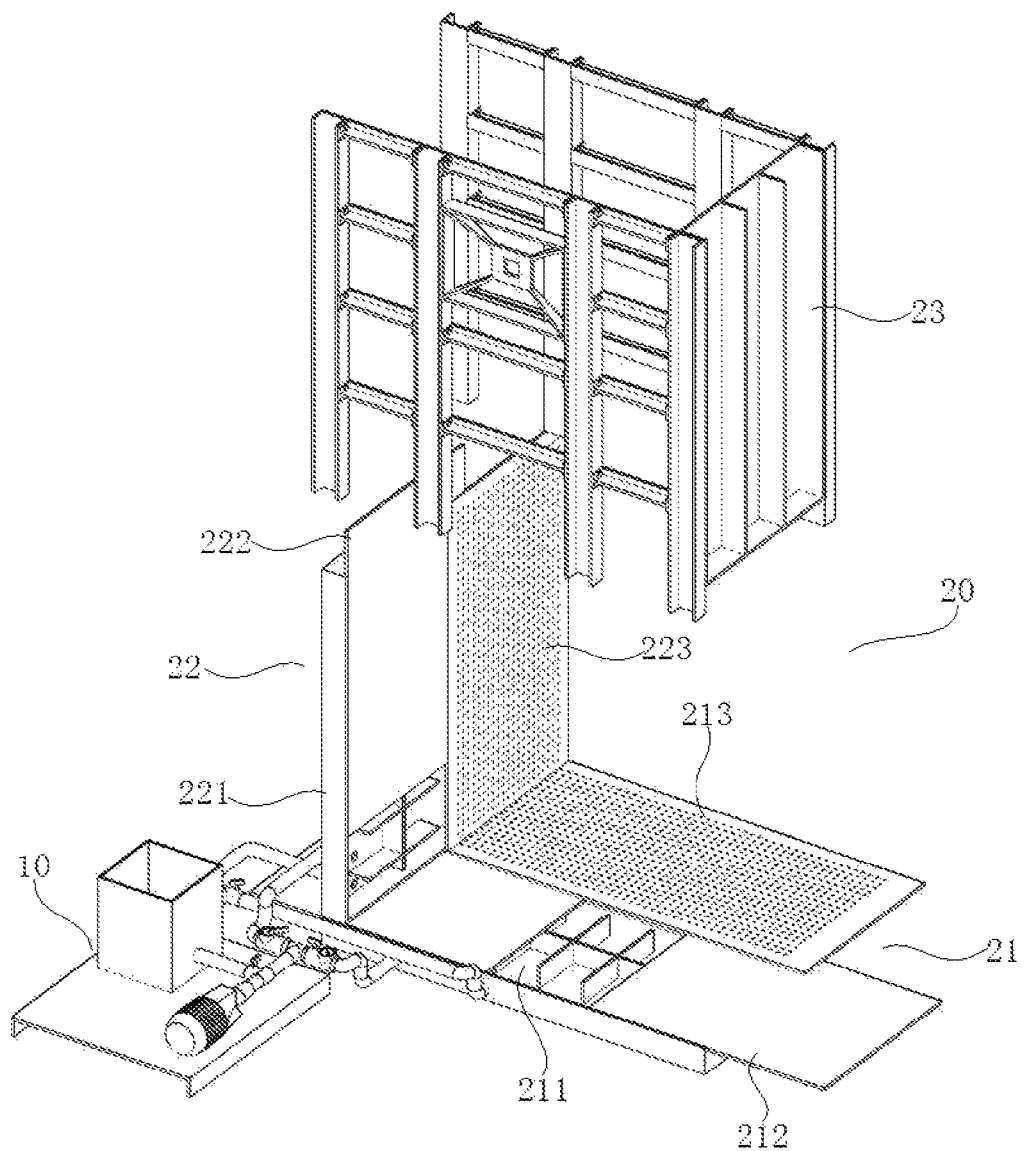

BIDIRECTIONAL VARIABLE CROSS-SECTION WATER-PRESSURE BEARER CYCLE TEST SYSTEM FOR COAL MINE WATER INRUSH MODEL TEST

FIELD OF THE INVENTION

The present invention relates to a water-pressure bearer measurement system, in particular a water-pressure bearer cycle measurement experiment system for test.

BACKGROUND OF THE INVENTION

Coal mine water inrush refers to a phenomenon of the sudden influx of massive groundwater into the mine workings when the geological structures such as water conducted zones, water-rich caves and old workings containing water are exposed by the roadway during underground mine tunneling or mining process. Mine water inrush always surges ferociously and submerges the tunnels in a short time so as to endanger the mine production and cause casualties. The huge casualties and property losses were caused by several largest water inrush accidents in history, such as the working face 2171 of Fangezhuang Mine, Kailuan, China, and the working face 2903 of Jinniu Energy Dongpang Mine, Hebei, China. Therefore, the study of coal mine water inrush has been always the focus of coal mine researches and has great social significance and economic interests.

Geomechanical model test is a reduced scale study method for specific engineering geological problems based on certain similarity principles and mainly used in the fields of the deformation process by external force, the stability and safety, and the failure mechanism, which is widely applied into buildings and foundations, underground engineering, mining and other construction industries. With respect to the theoretical research and numerical simulation studies, the geomechanical model test can simulate the structure, the integrity of the surrounding environment, the engineering construction process and the action mode and the time effect of loading and so on. It also can study the whole loading progress, the ultimate load and failure modes of the project, and provide the direct and visualizing results. In related research fields, relatively mature theories and application systems had been established, wherein the fluid-solid coupling geomechanical model test is a study of the interaction between two-phase medium of fluid and solid considering the percolation and other movements of fluid (water, gas, etc.) based on prior similarity simulation of solid mechanics. The coal mine water inrush is a important study object thereof.

Currently, the major Chinese universities and research institutes have been studying the fluid-solid coupling geomechanical model test, but the existing hydraulic loading systems are mostly customized by entrusting the related enterprises to manufacture. There are not only the lager cost of the test, but also the following problems that the loading process is affected by the stability limit of the pump and the load range is also limited within a small range; and since the fixed load range and the single loading method, it is difficult to achieve the local pressure when applying pressure at the bottom and the variable water-level loading when applying pressure at sidewall. The drainage problem after completion of test also causes serious problems to the entire model test.

SUMMARY

An object of the present invention is to provide a bidirectional variable cross-section water-pressure bearer cycle test system for a coal mine water inrush model test to overcome the existing technical problems of poor stability, small-range loading and single loading method of the conventional hydraulic system.

The bidirectional variable cross-section water-pressure bearer cycle test system for a coal mine water inrush model test in accordance with the present invention is consisted of a water-pressure loading section and a water-pressure bearer section. The water-pressure loading section comprises a water supply tank, a loading water pump, a water piezometer, a water control valve, an inlet pipe, a drain pipe and other devices to control the loaded water pressure and achieve the cyclic loading of the water pressure. The water-pressure bearer section is composed of a variable cross-section water-pressure bearer assembly and a variable water-level water-pressure bearer assembly, which is provided within a hermitic main frame.

The variable cross-section water-pressure bearer assembly is composed of a variable cross-section water storage tank, a variable cross-section water baffle and a variable cross-section porous plate, wherein a water inlet is provided on the end surface of the variable cross-section water storage tank toward the center of the main frame, the variable cross-section porous plate is covered on the water inlet of the variable cross-section water storage tank, and the water inlet of the variable cross-section water storage tank is partially covered by the variable cross-section water baffle between the variable cross-section porous plate and the water inlet of the variable cross-section water storage tank.

The variable water-level water-pressure bearer assembly is composed of a variable water-level water storage tank, a variable water-level water baffle and a variable water-level porous plate, wherein a water inlet is provided on the end surface of the variable water-level water storage tank toward the center of the main frame, the variable water-level porous plate is covered on the water inlet of the variable water-level water storage tank, and the water inlet of the variable water-level water storage tank is partially covered by the variable water-level water baffle between the variable water-level porous plate and the water inlet of the variable water-level water storage tank.

A part of the variable cross-section water baffle is fixed at the water inlet of the variable cross-section water storage tank and the other part is in sliding connection on the water inlet of the variable cross-section water storage tank.

The variable water-level water baffle is in sliding connection on the water inlet of the variable water-level water storage tank.

The variable cross-section water storage tank is provided at the bottom of the water-pressure bearer portion.

The variable water-level water storage tank is vertically disposed on one side of the water-pressure bearer portion.

One end of the drain pipe is connected with the outlet of the water supply tank and the other end of the drain pipe has two branch pipes, wherein the first branch pipe of the drain pipe is connected to the water inlet of the variable cross-section water storage tank and the second branch pipe of the drain pipe is connected to water inlet of the variable water-level water storage tank. One end of the inlet pipe is connected with the inlet of the water supply tank and the other end of the inlet pipe has two branch pipes, wherein the first branch pipe of the inlet pipe is connected to the water outlet of the variable cross-section water storage tank and the second branch pipe of the inlet pipe is connected to the water outlet of the variable water-level water storage tank.

The pump and the piezometer are loaded in series on the pipeline at the side of the drain pipe and the outlet of the water supply tank, and the water control valves are mounted on the major and branch pipelines of the drain pipe and the inlet pipe, respectively.

In the present invention, the bidirectional variable cross-section water-pressure bearer cycle test system is easy to install and operate, stable and safe, diverse and variable bearing method, and able to accurately and efficiently complete the bottom variable cross-section loading water-pressure and the sidewall variable water-level loading water-pressure of coal mine water inrush model test.

The specific advantages of the present invention are listed below.

(1) Better economy due to the materials easy to get and the low cost;
(2) Easy to install, replace, repair and operate;
(3) Bottom variable cross-section loading pressure and sidewall variable water-level loading pressure, controllable load-range and high accuracy;
(4) Stability and safety of the loading process and good applicability.

BRIEF DESCRIPTION OF DRAWINGS

FIG. 1 is a structure schematic view of the bidirectional variable cross-section water-pressure bearer cycle test system for coal mine water inrush model test in accordance with the present invention, in which:

10—water-pressure loading section; 20—water-pressure bearer section; 21—variable cross-section water-pressure bearer assembly; 211—variable cross-section water storage tank; 212—variable cross-section water baffle; 213—variable cross-section porous plate; 22—variable water-level water-pressure bearer assembly; 221—variable water-level water storage tank; 222—variable water-level water baffle; 223—variable water-level porous plate; 23—main frame.

DETAILED DESCRIPTION

As shown in FIG. 1, the bidirectional variable cross-section water-pressure bearer cycle test system in the embodiment is consisted of water-pressure loading section 10 and water-pressure bearer section 20.

The water-pressure loading section 10 comprises a water supply tank, a loading water pump, a water piezometer, a water control valve, an inlet pipe, a drain pipe and so on, to control the loaded water pressure and achieve the cyclic loading of the water pressure.

The water-pressure bearer section 20 is composed of a variable cross-section water-pressure bearer assembly 21 and a variable water-level water-pressure bearer assembly 22. The water-pressure bearer section 20 is mounted within a hermitic main frame 23.

The variable cross-section water-pressure bearer assembly 21 is composed of a variable cross-section water storage tank 211, a variable cross-section water baffle 212 and a variable cross-section porous plate 213.

The variable water-level water-pressure bearer assembly 22 is composed of a variable water-level water storage tank 221, a variable water-level water baffle 222 and a variable water-level porous plate 223.

In this embodiment, one end of the drain pipe is connected with the outlet of the water supply tank and the other end of the drain pipe has two branch pipes, wherein the first branch pipe of the drain pipe is connected to the water inlet of the variable cross-section water storage tank 211 and the second branch pipe of the drain pipe is connected to water inlet of the variable water-level water storage tank 221. One end of the inlet pipe is connected with the inlet of the water supply tank and the other end of the inlet pipe has two branch pipes, wherein the first branch pipe of the inlet pipe is connected to the water outlet of the variable cross-section water storage tank 211 and the second branch pipe of the inlet pipe is connected to the water outlet of the variable water-level water storage tank 221.

The pump and the piezometer are loaded in series on the major pipeline (pipe-wall) at the side of the drain pipe and the outlet of the water supply tank, and the water control valves are mounted on the major and branch pipelines of the drain pipe and the inlet pipe, respectively.

One end of the drain pipe is connected with the outlet of the water supply tank and the other end of the drain pipe has two branch pipes, wherein the first branch pipe of the drain pipe is connected to the water inlet of the variable cross-section water storage tank and the second branch pipe of the drain pipe is connected to water inlet of the variable water-level water storage tank. One end of the inlet pipe is connected with the inlet of the water supply tank and the other end of the inlet pipe has two branch pipes, wherein the first branch pipe of the inlet pipe is connected to the water outlet of the variable cross-section water storage tank and the second branch pipe of the inlet pipe is connected to the water outlet of the variable water-level water storage tank.

The pump and the piezometer are loaded in series on the pipeline at the side of the drain pipe and the outlet of the water supply tank, and the water control valves are mounted on the major and branch pipelines of the drain pipe and the inlet pipe, respectively. The water-pressure loading section 10 is used to adjust the pressure of water source and complete the recovery and recycling of water. A controllable water source connected with the water-pressure bearer section 20 can be formed by flow control of the loading pump via higher-level control system to achieve a pressure control of the controllable water source. The cycle system of the water-pressure loading section 10 also can achieve the water recycling as the experiment required to complete the recycling or recovery and the follow-up experiments.

As a preferred embodiment, the variable cross-section water storage tank 211 can be disposed on the bottom of the water-pressure bearer section 20.

The variable cross-section porous plate 212 can be disposed above the variable cross-section water storage tank 211.

The variable cross-section porous plate 212 can be detachable and the position of such variable cross-section water baffle 212 can be designed based on the test requirements.

The variable cross-section porous plate 213 is disposed above the variable cross-section water baffle 212.

Preferably, the variable water-level water storage tank 221 is vertically disposed on one side of the water-pressure bearer section 20.

The variable water-level water baffle 222 is vertically disposed on the inner side of the variable water-level water storage tank 221. The water-level is designed based on the test to determine the occlusion position of the variable water-level water baffle 222 to meet the test requirements.

The variable water-level porous plate 223 is vertically disposed on the inner side of the variable water-level water baffle 222.

Specifically, the main frame 23 of this embodiment is a hermetic hollow rectangular cube, in which each end surface thereof is provided with ribs.

The variable cross-section water storage tank 211 is provided on the bottom of the main frame 23. A water inlet is provided on the (top) end surface of the variable cross-section water storage tank 211 toward the center of the main frame 23. The variable cross-section porous plate 213 is covered on the water inlet of the variable cross-section water storage tank 211, and the water inlet of the variable cross-section water storage tank 211 is covered by the variable cross-section water baffle 212 between the variable cross-section porous plate 213 and the water inlet of the variable cross-section water storage tank 211. A part of the variable cross-section water baffle 212 (as a detachable structure) is fixed at the water inlet of the variable cross-section water storage tank 211 and the other part is in sliding connection on the water inlet of the variable cross-section water storage tank 211.

The variable water-level water storage tank 221 is provided on the inner sidewall of the main frame 23. A water inlet is provided on the end surface of the variable cross-section water storage tank 221 toward the center of the main frame 23. The variable cross-section porous plate 223 is covered on the water inlet of the variable cross-section water storage tank 221, and the water inlet of the variable cross-section water storage tank 221 is covered by the variable cross-section water baffle 222 between the variable cross-section porous plate 223 and the water inlet of the variable cross-section water storage tank 221. The variable cross-section water baffle 222 is in sliding connection on the water inlet of the variable cross-section water storage tank 221.

The water-pressure bearer section 20 accurately controls the source cross-section shape and the water level by setting different positions of the water storage tanks. After the water-pressure loading section 10 forms an initial water-pressure, the various simulation parameters of test model in accordance with the test process are formed by the sizes of each water inlets of the variable cross-section porous plate 213 and the variable cross-section water baffle 222 via the control of the higher-level control system for the sliding portions of the variable cross-section porous plate 213 and the variable cross-section water baffle 222, so as to ensure the minimization of the error of test procedure and the deviation of test model. The variable cross-section water-pressure bearer assembly 21 and the variable water-level water-pressure bearer assembly 22 can mounted within the main frame 23 at the matched angle as the test model required.

The fixed simulation parameters can be obtained by using the combination of the fixed dimensions of the variable cross-section water baffle 212 and the variable water-level water baffle 222 to cover the corresponding water inlets.

The above-mentioned embodiments are merely described to illustrate the preferred embodiments of the present invention, not intend to limit the scope of the present invention. Various modifications and changes to the embodiments made by those skilled in the art without departing in any way from the spirit of the present invention shall be fallen into the scope of the appended claims of the present invention.

INDUSTRIAL APPLICABILITY

The present invention can be applied into various geomechanical model tests including the fluid-solid coupled geomechanical model test and accurately simulate various loading processes. It has great practical significance for deformed shapes, stability and safety, and the quantization of breaking strength of the buildings and foundations, underground constructions, mining and other projects in the process by external force. Therefore, it has great market prospects and a strong industrial applicability.

The invention claimed is:

1. A bidirectional variable cross-section water-pressure bearer cycle test system which is used for a coal mine water inrush model test, comprising:
   a water-pressure loading section and a water-pressure bearer section, wherein
   the water-pressure bearer section comprises a variable cross-section water-pressure bearer assembly and a variable water-level water-pressure bearer assembly, and
   the water-pressure bearer section is provided within a hermetic main frame.

2. The bidirectional variable cross-section water-pressure bearer cycle test system according to claim 1, wherein
   the variable cross-section water-pressure bearer assembly comprises a variable cross-section water storage tank, a variable cross-section water baffle and a variable cross-section porous plate, wherein
   a water inlet is provided on an end surface of the variable cross-section water storage tank toward the center of a main frame,
   the variable cross-section porous plate is covered on the water inlet of the variable cross-section water storage tank, and
   the water inlet of the variable cross-section water storage tank is partially covered by the variable cross-section water baffle between the variable cross-section porous plate and the water inlet of the variable cross-section water storage tank.

3. The bidirectional variable cross-section water-pressure bearer cycle test system according to claim 2, wherein
   the variable water-level water-pressure bearer assembly further comprises a variable water-level water storage tank, a variable water-level water baffle and a variable water-level porous plate, wherein
   a water inlet is provided on an end surface of the variable water-level water storage tank toward the center of a main frame,
   the variable water-level porous plate is covered on the water inlet of the variable water-level water storage tank, and
   the water inlet of the variable water-level water storage tank is partially covered by the variable water-level water baffle between the variable water-level porous plate and the water inlet of the variable water-level water storage tank.

4. The bidirectional variable cross-section water-pressure bearer cycle test system according to claim 3, wherein
   a part of the variable cross-section water baffle is fixed at the water inlet of the variable cross-section water storage tank and the other part is in sliding connection on the water inlet of the variable cross-section water storage tank.

5. The bidirectional variable cross-section water-pressure bearer cycle test system according to claim 4, wherein
   the variable water-level water baffle is in sliding connection on the water inlet of the variable water-level water storage tank.

6. The bidirectional variable cross-section water-pressure bearer cycle test system according to claim 5, wherein
   the variable cross-section water storage tank is provided on the bottom of the water-pressure bearer portion.

7. The bidirectional variable cross-section water-pressure bearer cycle test system according to claim 6, wherein
   the variable water-level water storage tank is vertically disposed on one side of the water-pressure bearer portion.

8. The bidirectional variable cross-section water-pressure bearer cycle test system according to claim 7, wherein
one end of a drain pipe is connected with an outlet of a water supply tank and the other end of the drain pipe has two branch pipes, wherein
the first branch pipe of the drain pipe is connected to the water inlet of the variable cross-section water storage tank and the second branch pipe of the drain pipe is connected to water inlet of the variable water-level water storage tank;
one end of an inlet pipe is connected with the inlet of the water supply tank and the other end of the inlet pipe has two branch pipes, wherein
the first branch pipe of the inlet pipe is connected to a water outlet of the variable cross-section water storage tank and the second branch pipe of the inlet pipe is connected to a water outlet of the variable water-level water storage tank.

\* \* \* \* \*